No. 752,727. PATENTED FEB. 23, 1904.
E. A. UEHLING.
LINK CHAIN.
APPLICATION FILED OCT. 16, 1903.
NO MODEL. 2 SHEETS—SHEET 1.
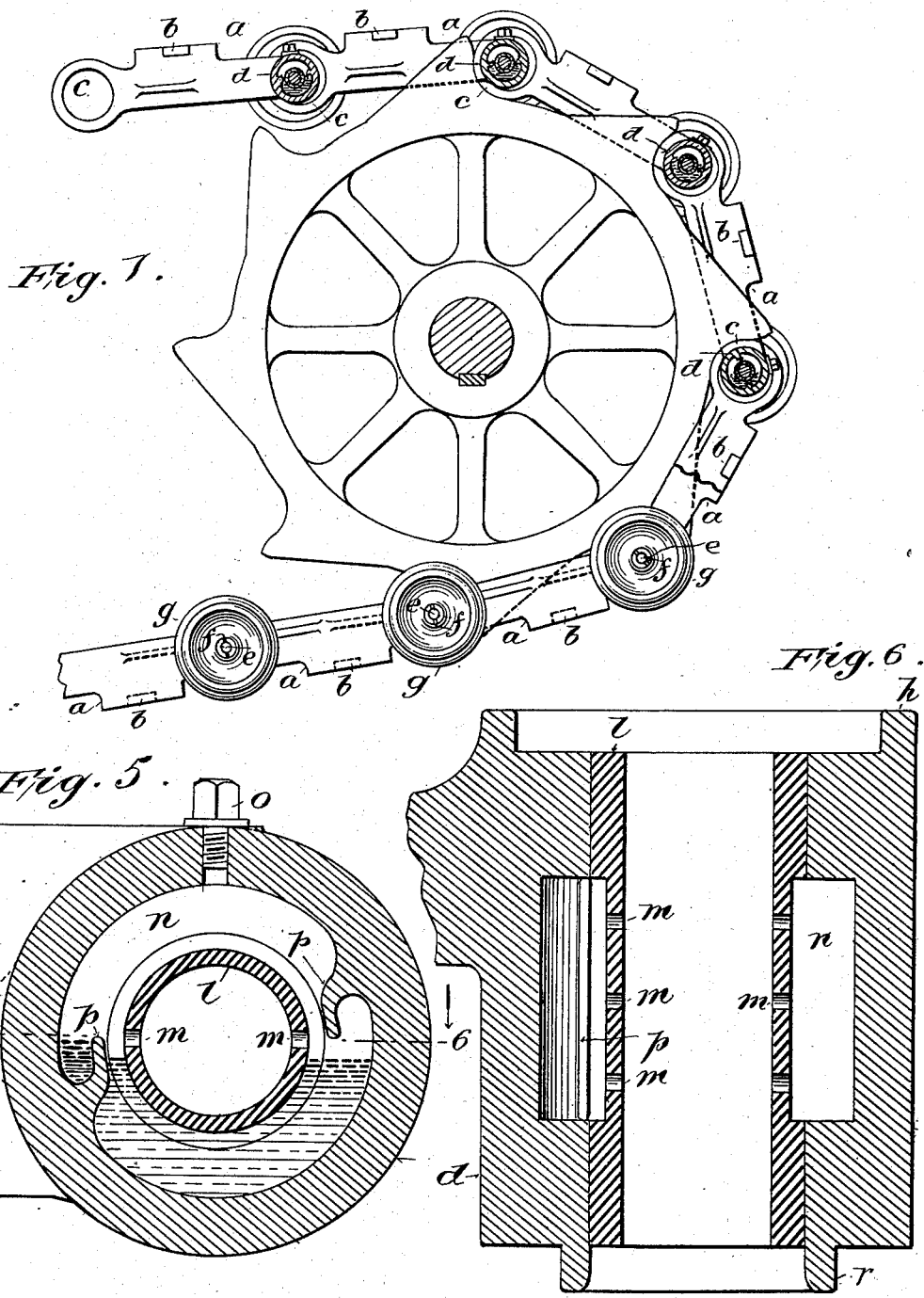

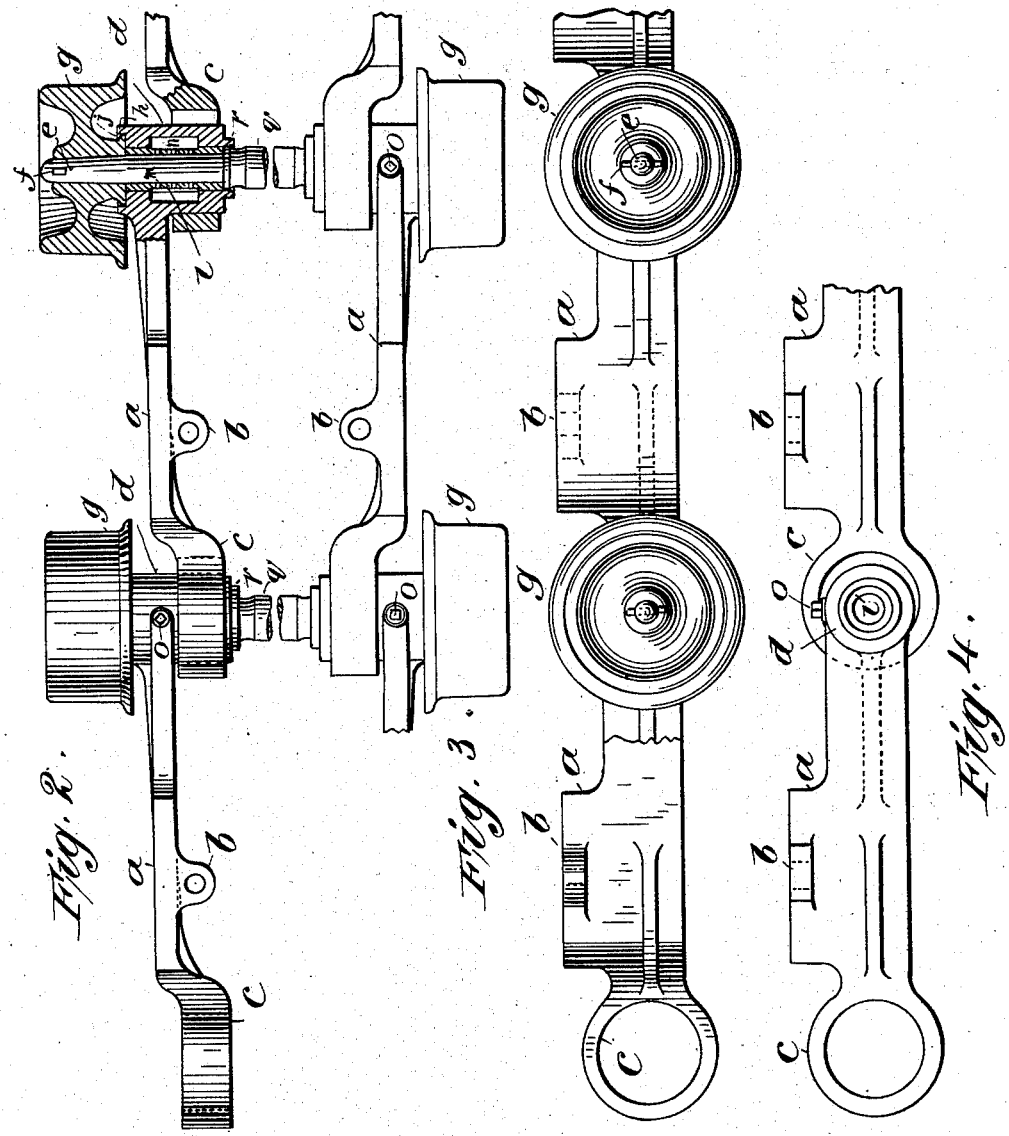

No. 752,727.    Patented February 23, 1904.

UNITED STATES PATENT OFFICE.

EDWARD A. UEHLING, OF PASSAIC, NEW JERSEY.

LINK CHAIN.

SPECIFICATION forming part of Letters Patent No. 752,727, dated February 23, 1904.

Application filed October 16, 1903. Serial No. 177,262. (No model.)

*To all whom it may concern:*

Be it known that I, EDWARD A. UEHLING, mechanical engineer, a citizen of the United States, and a resident of Passaic, Passaic county, New Jersey, have invented certain new and useful Improvements in Link Chains, of which the following is a specification, illustrated by the accompanying drawings.

This invention relates to endless chains composed of a series of links, and in particular to that class of chains supported on rollers or wheels used for carrying receptacles conveying heavy materials—such as coal, ore, rock, &c.—and more especially adapted to carry molten pig-iron in heavy molds.

In the form of chain at present in use for the above purposes the wheels or rollers supporting the chain with its load generally revolve about the axles or pins, which latter at the same time serve to connect the links and their adjoining ends. This construction makes it very difficult to keep the bearings and joints properly lubricated and impossible to keep out the dust and grit, causing excessive wear. In the application of such endless chains and accessories to the casting and conveying of pig-iron the spattering of the molten metal in the form of minute globules and splinters find their way into the joints and bearings of the chains as ordinarily constructed, cutting them so badly that they are rapidly destroyed.

The object of this invention is to overcome the above-enumerated and other difficulties by constructing the component parts of the chain in the form and manner below set forth.

In the drawings, Figure 1 is a view of a sprocket-wheel and part of the chain, the chain being shown partly in section; Fig. 2, a plan view of two of the links and their flange-wheels, a portion of one of the links and one of the wheels being seen in section. Fig. 3 is a side view of a pair of links and their respective wheels; Fig. 4, the same without the wheels. Fig. 5 is a cross-section showing the oil-cavity in detail, and Fig. 6 a cross-section on the plane 6 6 of Fig. 5.

The link $a$ consists of a central web portion provided with the projection $b$, adapted to carry the mold. One end of the link terminates in the eye $c$ and the other in the boss $d$, which enters the eye $c$ of the next adjoining link, as shown in Fig. 2 and Fig. 4. The boss is made so much smaller than the eye to permit a rolling action between them when the links take the angle necessary in relation to each in passing around the sprocket-wheels, as shown in Fig. 1. By this means the friction, and hence the wear, in the joints of the chain is reduced to a minimum.

The axle $e$ passes through the bosses $d$ of the two parallel chains and extends beyond it on both sides and has secured to it, by means of the pins $f$, the flange-wheels $g$, whereby the axle and wheels rotate together. The general construction of these wheels forms no part of this invention save in the manner they coöperate with the rim of the collar $d$. The inner portion of the wheels is provided with the flange $j$, which fitting within the rim $h$ forms a dust-proof joint, protecting the bearing from dust and small particles of iron. In a similar manner for the same purpose the opposite side of the boss $d$ has a rim extending over the shaft, preventing the particles of dust and grit from entering the bearing from that side. A groove cut into the shaft directly under the rim makes the bearing still more dust-proof.

Surrounding the axle $e$ and lying within the boss $d$ is the sleeve $l$, which forms a bearing-surface for the axle. This sleeve is provided with small openings $m$, as seen in Fig. 6.

Surrounding the axle $e$ and separated from it by the sleeve $l$ is the annular cavity $n$, which is provided with a hole closed by the screw-cap $o$, forming a means by which lubricating-oil may be poured into the cavity. Midway on opposite sides of the cavity $n$ are the deflecting-webs $p$, lying in the axis of the length of the link, which are cast integral with the boss $d$, projecting for a portion of their length toward the center and then turning at almost a right angle terminate in the form shown, forming a deflecting web or bucket, preferably extending the entire length of the cavity $n$. It will be noticed that these webs terminate nearly opposite the openings $m$ in the sleeve. When the desired amount of lubricant has been fed through the opening and the cap $o$ screwed into position, the lubricant, if the boss $d$ is in the position shown in Fig.

5, will assume an approximately horizontal position below the level of the openings m. One of the buckets in the cavity n will always be filled with oil. Now when the chain passes around the sprocket-wheel, (see Fig. 1,) the position of the buckets being fixed with relation to the link and sleeve will empty its contents of oil into the holes of the sleeve, the buckets exchanging their position with relation to the oil. The oil in excess of what the bearing takes in through the holes m runs back into the cavity n. This operation repeats itself every time the direction of the motion of the chain is reversed. Oil is thus applied twice in every complete circuit of the chain. In the preferred form shown two buckets are used, though in many cases one may suffice, and in others more than two may be employed. By this means the bearing-surface will be kept well lubricated, and since there is no waste fresh lubricant will not be needed for a considerable time, as the cavity n will act as a supply-well.

Without describing the many modifications of which this invention is capable, what I claim as the novel and characteristic features of this my invention are the following:

1. The combination in link chains adapted to carry receptacles for conveying material, of links, each of said links being provided at one extremity with an eye, and at the other extremity with a boss, each of said bosses being adapted to engage the eye of the next succeeding link, the outside of the boss being smaller than the inside of the eye, for establishing a rolling connection of the said boss within the said eye, axles transversely connecting said eyes and said bosses, and means for lubricating the bearing-surfaces of said axles, substantially as set forth and described.

2. The combination in two parallel moving chains, of links, each of said links being provided at one extremity with an eye, and at the other extremity with a boss, axles transversely connecting said two chains and passing through and having a bearing within said bosses, and means for lubricating the said bearings, substantially as shown and described.

3. In a link-chain connection, consisting of two parallel link chains, the combination of two links in each of said chains, an axle adapted to connect their associated ends, each of said links being provided at one extremity with an eye and at the other extremity with a boss, each of said bosses coöperating with the eye of the next succeeding link, a sleeve situate within each of said bosses surrounding the extremities of said axle, and adapted to act as bearing-surfaces for said axle, each of said bosses being provided with a cavity adapted to contain lubricating fluid, deflecting-partitions within said cavities, means for connecting said bearing-surfaces with said cavities, and means adapted to support said chains and said axles, substantially as described.

4. In a link-chain connection the combination of two links, each of said links being provided with an eye and a boss, an axle adapted to connect their associated ends, said axle being supported within said boss, a wheel keyed upon the extremity of said axle, a flange upon the inner surface of said wheel, and a rim located within said boss, and coöperating with said flange to form a substantially dust-tight joint, substantially as set forth and described.

5. The combination in two parallel chains, of links, each of said links being provided at one extremity with an eye, and at the other extremity with a boss, axles connecting the said two chains, bearings within said bosses adapted to support said axles, means located within said bosses for lubricating said bearings and means adapted to form a substantially dust-tight joint about said bearing-surfaces, substantially as set forth and described.

6. In a link chain, the combination of two links, an axle adapted to connect their associated ends, and having a bearing within one of said ends, the same said end being provided with a cavity adapted to contain a lubricant, means for admitting lubricant to said cavity, deflecting-partitions situate within said cavity and means connecting the bearing-surface of said axle with the said cavity, substantially as set forth.

Signed this 20th day of July, 1903, at New York.

ED. A. UEHLING.

Witnesses:
JAS. GRAHAM,
WALTER F. HINCKLEY.